(No Model.)

C. H. KELLOGG.
DEVICE FOR TRANSFORMING MOTION.

No. 357,932. Patented Feb. 15, 1887.

Witnesses:
Aly Barkoff
John E. Parker

Inventor:
Charles H. Kellogg
by his Attorneys
Howson & Sons

UNITED STATES PATENT OFFICE.

CHARLES H. KELLOGG, OF NORTH AMHERST, MASS., ASSIGNOR OF ONE-HALF TO FRANCIS G. BATES, OF PHILADELPHIA, PA.

DEVICE FOR TRANSFORMING MOTION.

SPECIFICATION forming part of Letters Patent No. 357,932, dated February 15, 1887.

Application filed October 20, 1886. Serial No. 216,721. (No model.)

*To all whom it may concern:*

Be it known that I, CHARLES H. KELLOGG, a citizen of the United States, residing in North Amherst, Hampshire county, Massachusetts, have invented certain Improvements in Devices for Transforming Motion, of which the following is a specification.

My invention relates to devices whereby a reciprocating or vibrating movement is transformed into a continuous rotary movement, my improvements being especially in that form of device which is shown in my Patent No. 248,758, dated October 25, 1881, and which consists of two arms, each having a friction-dog acting upon the periphery of a drum on the shaft to be rotated, one arm being moved forward and imparting its movement to the drum while the other arm is being retracted in order to bring its dog or catch into position to take a fresh hold upon the drum.

The main object of my present improvements is to simplify the construction of a device of this class, and this object I attain in the manner hereinafter set forth, reference being had to the accompanying drawings, in which—

Figure 1:
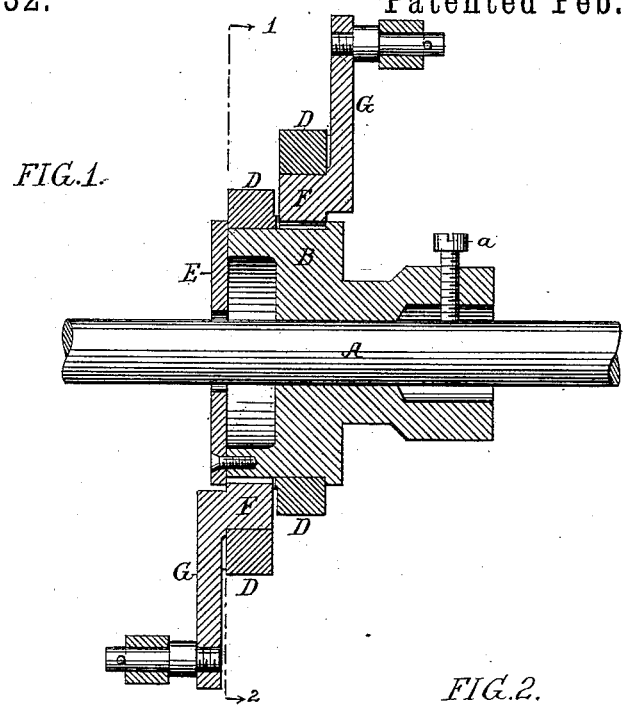
Figure 2:
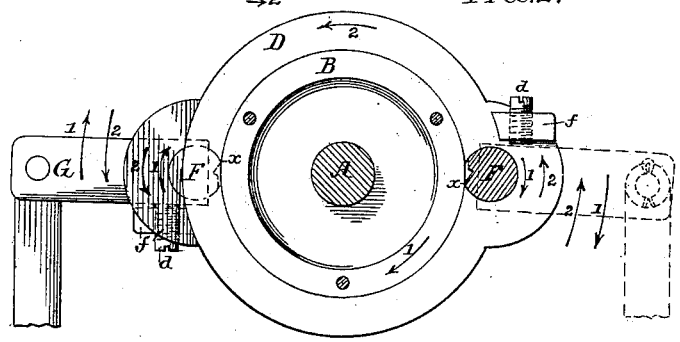
Figure 3:
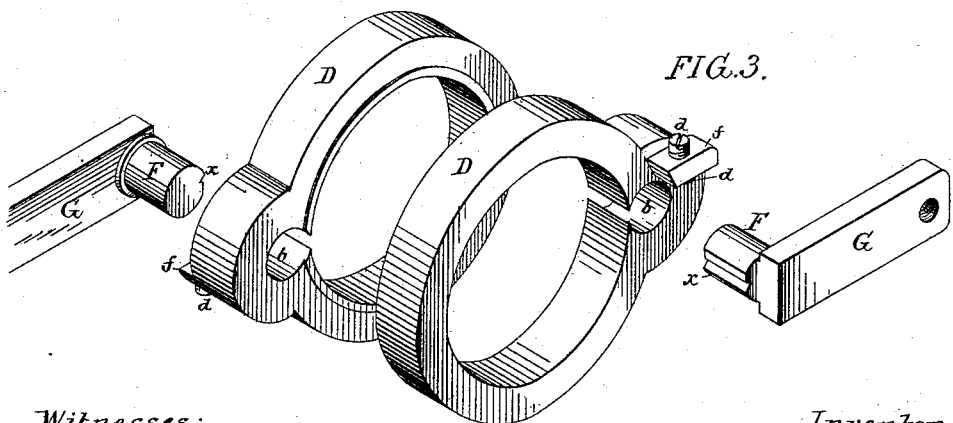

Figure 1 is a longitudinal section, partly in elevation, of a device constructed in accordance with my present invention; Fig. 2, a transverse section on the line 1 2, Fig. 1; and Fig. 3, a perspective view of a portion of the device with the parts detached from each other.

A represents a portion of the shaft to which rotary motion is to be imparted, and B is a drum, the hub of which is secured to said shaft by means of a set-screw, $a$, or in any other suitable manner.

Free to turn loosely on the drum B are two rings or carriers, D D, which are retained in position laterally on the drum by means of a face-plate, E. In each of the carriers is formed a transverse opening, $b$, communicating with the central opening of the carrier, and to each of these openings is adapted a dog, F, which consists of a simple pin of the same diameter as the opening, this pin being flattened or cut away on the side adjacent to the central opening of the carrier, and each dog is secured to or forms part of a projecting arm, G, located laterally beyond the carrier and connected by means of a suitable rod to the treadle, reciprocating cross-head, or other device the movement of which is to be transformed into the rotary movement of the shaft A. Each dog constitutes, in effect, the pivot-pin for its operating-arm, and is free to rock to a limited extent in its opening in the carrier movement of the dog in the direction of the arrow 1, Fig. 2, being limited by contact of the nose of said dog with the periphery of the drum B, and movement of the dog in the direction of the arrow 2, Fig. 2, being limited by contact of the arm G of the dog with a stop-screw, $d$, carried by a lug, $f$, on the carrier, this screw being adjustable so as to regulate the free backward movement of the arm, as desired. The latter movement is just sufficient to free the nose $x$ of the dog from contact with the periphery of the drum B; hence, when either arm G is moved in the direction of the arrow 2, Fig. 2, the dog of said arm and its carrier will be free to travel on the drum B in the direction of the arrow 2 on the carrier, while when the arm is moved in the direction of the arrow 1 the first effect of the movement will be to bring the nose $x$ of the dog into contact with the drum, and thus lock the carrier thereto, so that any further movement of the arm in the direction of said arrow 1 will cause a forward movement of both the carrier and drum in the direction of the arrow 1 on the latter, as will be readily understood.

As shown in the drawings, the dogs are located in diametrically-opposite positions, and the arms of both dogs are intended to be elevated and depressed simultaneously, one dog being constructed to engage with the drum on the upward movement and the other on the downward movement, so that a continuous forward movement is effected. It will be evident, however, that the arms may be arranged and operated as shown in my former patent without departing from my present invention, which consists in the novel plan of constructing the dogs F and hanging them to the carriers, so as to simplify the construction of the device and obviate the necessity of expensive fitting of parts and the use of special pivot-pins for the operating-arms.

In place of using a drum, B, the carriers may be hung directly to and the dogs may act directly upon the shaft or a hub or enlargement thereon; hence in the claims I have used the word "shaft" in the sense either of the shaft itself or any device rigidly attached thereto or forming part thereof.

My improved device may be employed as a means of transforming reciprocating into rotary motion in sewing-machines, lathes, small engines, or, generally, as a substitute for the crank in different classes of machinery.

I claim as my invention—

1. The combination of the shaft, a carrier free to turn thereon, an operating-arm, and a dog constituting a pivot-pin for said arm and having a bearing in an opening in said carrier, said dog being free to turn to a limited extent, and being constructed as described, whereby when moved forward it will engage with the shaft and lock the carrier thereto, but when moved backward will be freed from the shaft and permit the carrier to turn thereon, all substantially as specified.

2. The combination of the shaft, a carrier free to turn thereon, an operating-arm extending laterally beyond the carrier, and a dog constituting the pivot-pin of the arm and adapted to an opening in the carrier, but free to turn to a limited extent in said opening, all substantially as specified.

3. The combination of the shaft, a carrier free to turn thereon and having an opening therein, and a locking-dog consisting of a pin adapted to the opening of the carrier, but cut away on the side adjacent to the shaft, said dog being secured to or forming part of an operating-arm and constituting the pivot of said arm, all substantially as specified.

4. The combination of the shaft, a carrier free to turn thereon, an operating-arm, a dog adapted to an opening in the carrier and constituting the pivot-pin of the arm, and a stop on the carrier for limiting the backward movement of the operating-arm independently of the said carrier, all substantially as specified.

In testimony whereof I have signed my name to this specification in the presence of two subscribing witnesses.

CHAS. H. KELLOGG.

Witnesses:
FORESTER P. AINSWORTH,
MARTHA M. AINSWORTH.